United States Patent
Yu et al.

(10) Patent No.: US 10,922,550 B2
(45) Date of Patent: Feb. 16, 2021

(54) ABNORMAL VIDEO FILTERING

(71) Applicant: INTERNATIONAL BUSINESS MACHINES CORPORATION, Armonk, NY (US)

(72) Inventors: Ying-Chen Yu, Taipei (TW); Chih-Wen Su, Shihlin (TW); Jeff Hsueh-Chang Kuo, Taipei (TW); June-Ray Lin, Taipei (TW)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 89 days.

(21) Appl. No.: 16/408,616

(22) Filed: May 10, 2019

(65) Prior Publication Data

US 2020/0356779 A1 Nov. 12, 2020

(51) Int. Cl.
*G06K 9/00* (2006.01)
*G06K 9/62* (2006.01)
*G06T 7/00* (2017.01)

(52) U.S. Cl.
CPC ..... *G06K 9/00718* (2013.01); *G06K 9/00744* (2013.01); *G06K 9/00765* (2013.01);
(Continued)

(58) Field of Classification Search
CPC ............. G06K 9/00718; G06K 9/6262; G06K 9/6257; G06K 9/00765; G06K 9/00744;
(Continued)

(56) References Cited

U.S. PATENT DOCUMENTS 8,510,252 B1 8/2013 Gargi et al.
8,954,358 B1 * 2/2015 Zhang .................. G06K 9/6292
706/12

(Continued)

FOREIGN PATENT DOCUMENTS

WO 2016018728 A2 2/2016

OTHER PUBLICATIONS

Kushal, et al., "KidsTube: Detection, Charaterization and Analysis of Child Unsafe Content & Promoters on YouTube," Cybersecurity Education and Research Centre (CERC), Indraprastha Institute of Information Technology, 8 pages.
(Continued)

*Primary Examiner* — Phuoc Tran
(74) *Attorney, Agent, or Firm* — Cantor Colburn LLP; Richard Wilhelm

(57) ABSTRACT

Methods, systems and computer program products for flagging abnormal videos are provided. Aspects include training an image recognition model based on a plurality of images that depict one or more of a plurality of subjects. Aspects also include generating a normal subject relationship graph representing normal relationships between the plurality of subjects by applying the image recognition model to a plurality of training videos and a test subject relationship graph representing test relationships between subjects depicted in a test video by applying the image recognition model to the test video. Each normal relationship is associated with a strength value. Responsive to determining that a difference between a strength value associated with a first normal relationship and a strength value associated with a corresponding first test relationship exceeds a predetermined threshold, aspects include flagging the test video as being abnormal.

20 Claims, 7 Drawing Sheets

(52) U.S. Cl.
CPC ......... *G06K 9/6257* (2013.01); *G06K 9/6262* (2013.01); *G06T 7/0002* (2013.01); *G06T 2207/10016* (2013.01); *G06T 2207/20072* (2013.01); *G06T 2207/20081* (2013.01)

(58) Field of Classification Search
CPC ......... G06T 7/0002; G06T 2207/10016; G06T 2207/20081; G06T 2207/20072
See application file for complete search history.

(56) References Cited

U.S. PATENT DOCUMENTS

| | | |
|---|---|---|
| 2015/0161672 A1 | 6/2015 | Jung et al. |
| 2017/0295215 A1 | 10/2017 | Syed |
| 2019/0258671 A1* | 8/2019 | Bou ................... G06K 9/00751 |
| 2019/0304157 A1* | 10/2019 | Amer ................... G06N 3/0445 |

OTHER PUBLICATIONS

Ochoa, et al., "Adult Video Content Detection Using Machine Learning Techniques," Eighth International Conference on Signal Image Technology and Internet Based Systems (SITIS), Nov. 2012, 14 pages.

* cited by examiner

ABNORMAL VIDEO FILTERING

BACKGROUND

The present invention generally relates to video processing systems, and more specifically, filtering of abnormal videos.

Several popular websites and online platforms allow users to upload user-generated videos for public viewing. While such systems commonly include a mechanism to flag videos that include inappropriate content, these systems rely on human viewers to view and flag such videos manually.

SUMMARY

Embodiments of the present invention are directed to a computer-implemented method for filtering abnormal videos. A non-limiting example of the computer-implemented method includes receiving a plurality of images that depict one or more of a plurality of subjects. The method also includes training an image recognition model based on the plurality of images. The image recognition model is trained to recognize one or more of the plurality of subjects in images. The method also includes generating a normal subject relationship graph comprising representations of normal relationships between the plurality of subjects by applying the image recognition model to a plurality of training videos. The normal subject relationship graph includes a representation of at least a first normal relationship between a first subject and a second subject. Each normal relationship is associated with a strength value. The method also includes generating a test subject relationship graph comprising representations of test relationships between subjects depicted in the test video by applying the image recognition model to a test video. The test subject relationship graph includes a representation of at least a first test relationship between the first subject and the second subject. Each test relationship is associated with a strength value. Responsive to determining that a difference between a strength value associated with the first normal relationship and a strength value associated with the first test relationship exceeds a predetermined threshold, the method includes flagging the test video as being abnormal.

Embodiments of the present invention are directed to a system for filtering abnormal videos. The system includes a memory having computer readable computer instructions, and a processor for executing the computer readable instructions. The computer readable instructions include instructions for receiving a plurality of images that depict one or more of a plurality of subjects. The computer readable instructions also include instructions for training an image recognition model based on the plurality of images. The image recognition model is trained to recognize one or more of the plurality of subjects in images. The computer readable instructions also include instructions for generating a normal subject relationship graph comprising representations of normal relationships between the plurality of subjects by applying the image recognition model to a plurality of training videos. The normal subject relationship graph includes a representation of at least a first normal relationship between a first subject and a second subject. Each normal relationship is associated with a strength value. The computer readable instructions also include instructions for generating a test subject relationship graph comprising representations of test relationships between subjects depicted in the test video by applying the image recognition model to a test video. The test subject relationship graph includes a representation of at least a first test relationship between the first subject and the second subject. Each test relationship is associated with a strength value. Responsive to determining that a difference between a strength value associated with the first normal relationship and a strength value associated with the first test relationship exceeds a predetermined threshold, the computer readable instructions include instructions for flagging the test video as being abnormal.

Embodiments of the invention are directed to a computer program product for filtering abnormal videos, the computer program product comprising a computer readable storage medium having program instructions embodied therewith. The computer readable storage medium is not a transitory signal per se. The program instructions are executable by a processor to cause the processor to perform a method. A non-limiting example of the method includes receiving a plurality of images that depict one or more of a plurality of subjects. The method also includes training an image recognition model based on the plurality of images. The image recognition model is trained to recognize one or more of the plurality of subjects in images. The method also includes generating a normal subject relationship graph comprising representations of normal relationships between the plurality of subjects by applying the image recognition model to a plurality of training videos. The normal subject relationship graph includes a representation of at least a first normal relationship between a first subject and a second subject. Each normal relationship is associated with a strength value. The method also includes generating a test subject relationship graph comprising representations of test relationships between subjects depicted in the test video by applying the image recognition model to a test video. The test subject relationship graph includes a representation of at least a first test relationship between the first subject and the second subject. Each test relationship is associated with a strength value. Responsive to determining that a difference between a strength value associated with the first normal relationship and a strength value associated with the first test relationship exceeds a predetermined threshold, the method includes flagging the test video as being abnormal.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
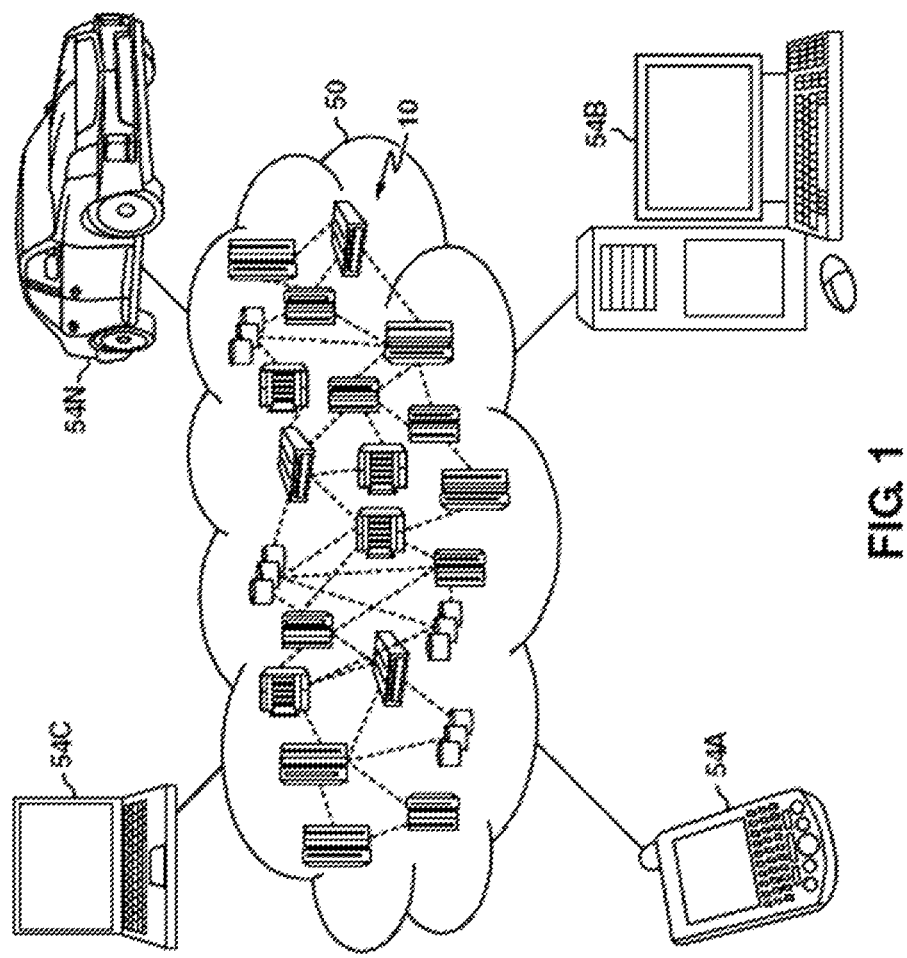
FIG. 1 depicts a cloud computing environment according to one or more embodiments of the present invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describe having a communications path between two elements and do not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
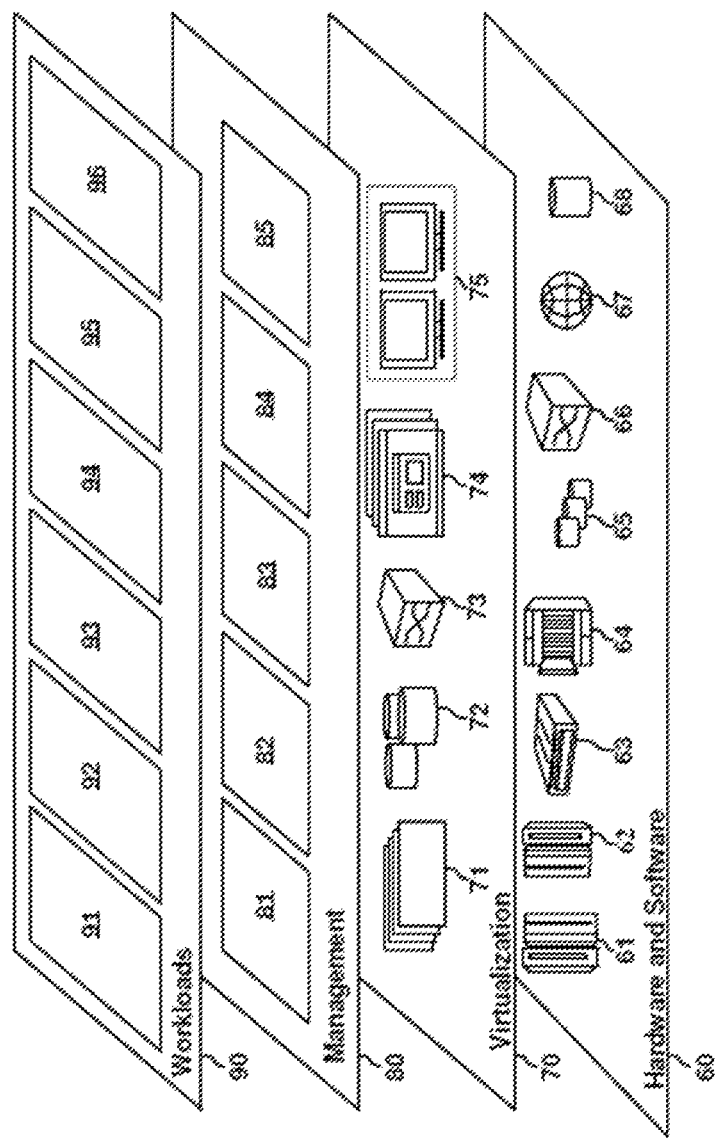
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and filtering abnormal videos 96.

Figure 3:
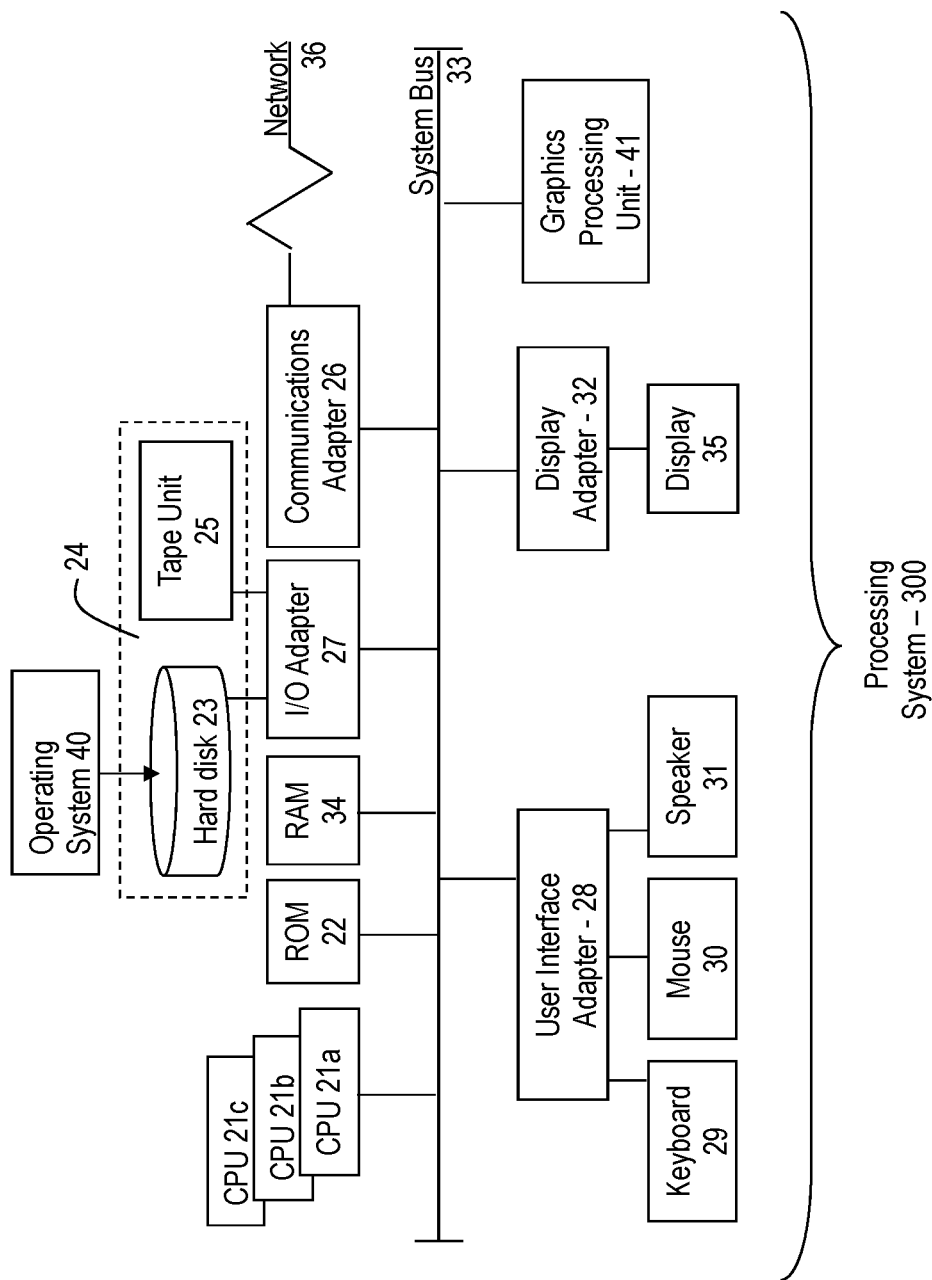
FIG. 3 depicts a block diagram of a computer system for use in implementing one or more embodiments of the present invention.

Referring to FIG. 3, there is shown an embodiment of a processing system 300 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 3.

As mentioned above, various websites and online platforms that allow users to upload user-generated videos for public viewing commonly include a mechanism to flag videos that include inappropriate content. These systems generally rely on human viewers to view and flag such videos manually, which is often impractical given the large number of videos uploaded to the Internet on a daily basis. Recently, there have been discoveries of inappropriate content in videos that feature representations of popular television and movie characters that are generally intended to appeal to children and young adults. Because such content outwardly appears to be directed towards children, it is often less likely to be viewed in full by an adult that would be likely to flag the content as inappropriate. Further, because the intent of the creators of such videos may be to disguise the inappropriate content as child-friendly content, filtering the video based on the title or Uniform Resource Locator (URL) is not likely to be an effective means of detecting and filtering such videos.

In exemplary embodiments, a system for filtering abnormal videos is provided. In exemplary embodiments, the system for filtering abnormal videos may operate by determining relationships between subjects (i.e., characters, objects, etc.) in a test video and comparing them to previously established "normal" relationships between the characters to identifying test videos with discrepancies with normal relationships as being abnormal videos that should be flagged and/or filtered. Thus, the system may be configured to identify videos that present an abnormal mix of characters. In this context, "normal" may be considered to mean the typical, expected or authorized content creator-intended relationship between characters. Further, the "relationship" may refer to the degree or frequency with which a pair of characters appear on-screen together. For example, a first set of characters that are depicted in a first movie franchise (i.e., a movie with one or more sequels) may be expected to have a relatively strong relationship to one another and a second set of characters that are depicted in a second movie franchise may also be expected to have a relatively strong relationship to one another, but the two sets of characters may not be expected to have any relation to one another, as they may exist in different fictional universes. Thus, if two such characters from the different sets of characters appear in a video published online, this video may be considered to be abnormal. However, if a movie studio puts out a new movie that is a "cross-over" movie between the two movie franchises (i.e., one or more of the characters of the first set interacts with one or more of the second set within the movie), then the normal relationships between the two sets of characters may begin to be established and it may not be abnormal for such characters to appear together in other newly uploaded videos.

Generally, the system for filtering abnormal videos may establish normal relationships between a plurality of characters, objects, or other subjects by applying an image recognition model to a plurality of training videos to determine the degree of shared on-screen time between various subjects and representing these relationships as a normal subject relationship graph. For example, a movie studio may provide a group of movies that feature a range of different characters and an image recognition model may be trained to recognize each of the characters in the group of movies. The image recognition model may be applied to the group of movies to determine the percentage of time various characters (and other objects) are shown together on screen, which can be considered to be the strength of the relationship between characters. In other words, two characters that often appear on screen together may be considered to have a strong relationship to one another, whereas two other characters that only appear on screen together once or twice may be considered to have a weak relationship. According to some embodiments, two characters that never appear on screen together may be considered to have no direct relationship, although they may have an indirect relationship via common relation to one or more other characters. In this way, the normal relationships between the characters may be established and mapped onto the normal subject relationship graph. The normal subject relationship graph may include a node for each subject (i.e., character, object, etc.) and a link between each pair of subjects that are directly related (i.e., that share on-screen time together). Each link may have a weight that represents the strength of the relationship. It will be understood that the normal subject relationship graph may be updated by the system over time as new videos are provided by an authorized source (e.g., by a movie studio owning rights to the characters).

The system may generate a test subject relationship graph based on a test video in a manner similar to that of the creation of the normal subject relationship graph. The test subject relationship graph may similarly include nodes and links that represent subjects depicted by the test video and the relationships between them. The relationships of the test subject relationship graph may be compared to the relationships of the normal subject relationship graph to determine if there are any abnormalities. According to some embodiments, the test subject relationship graph may include an abnormal relationship if the strength of the relationship between two characters differs from the strength of the relationship of the same two characters as represented by the normal subject relationship graph by more than a predetermined threshold. For example, if two characters are shown as having no relationship or a very weak relationship in the normal subject relationship graph, but are shown as having a very strong relationship in the test subject relationship graph, the test video associated with the test subject relationship graph may be flagged as being abnormal. According to various embodiments, videos that are flagged as being abnormal may be automatically filtered, restricted from access or presented to a human for further review and classification.

In this way, the techniques presented herein can automatically identify and flag abnormal videos without relying on manual detection or simple screening of video names. Further, because the disclosed system can be trained with content provided by authorized parties (e.g., production studios, owners of rights in characters, etc.), the system may be automatically updated via connection to servers of the authorized party. For example, a movie studio may provide the system with remote access to a repository of images and/or videos that can be used for training the image recognition model and/or generating the normal subject relationship graph. According to some embodiments, the models may be retrained/regenerated periodically or in response to an update to the repository, such that the models may be up to date in accordance with new authorized content created by the authorized party. Thus, the content of videos that are considered to be abnormal may automatically change over time as the normal relationships between characters naturally change with further installations of popular movie franchises, further episodes of popular television shows, or the subsequent creation of other similar content.

Figure 4:
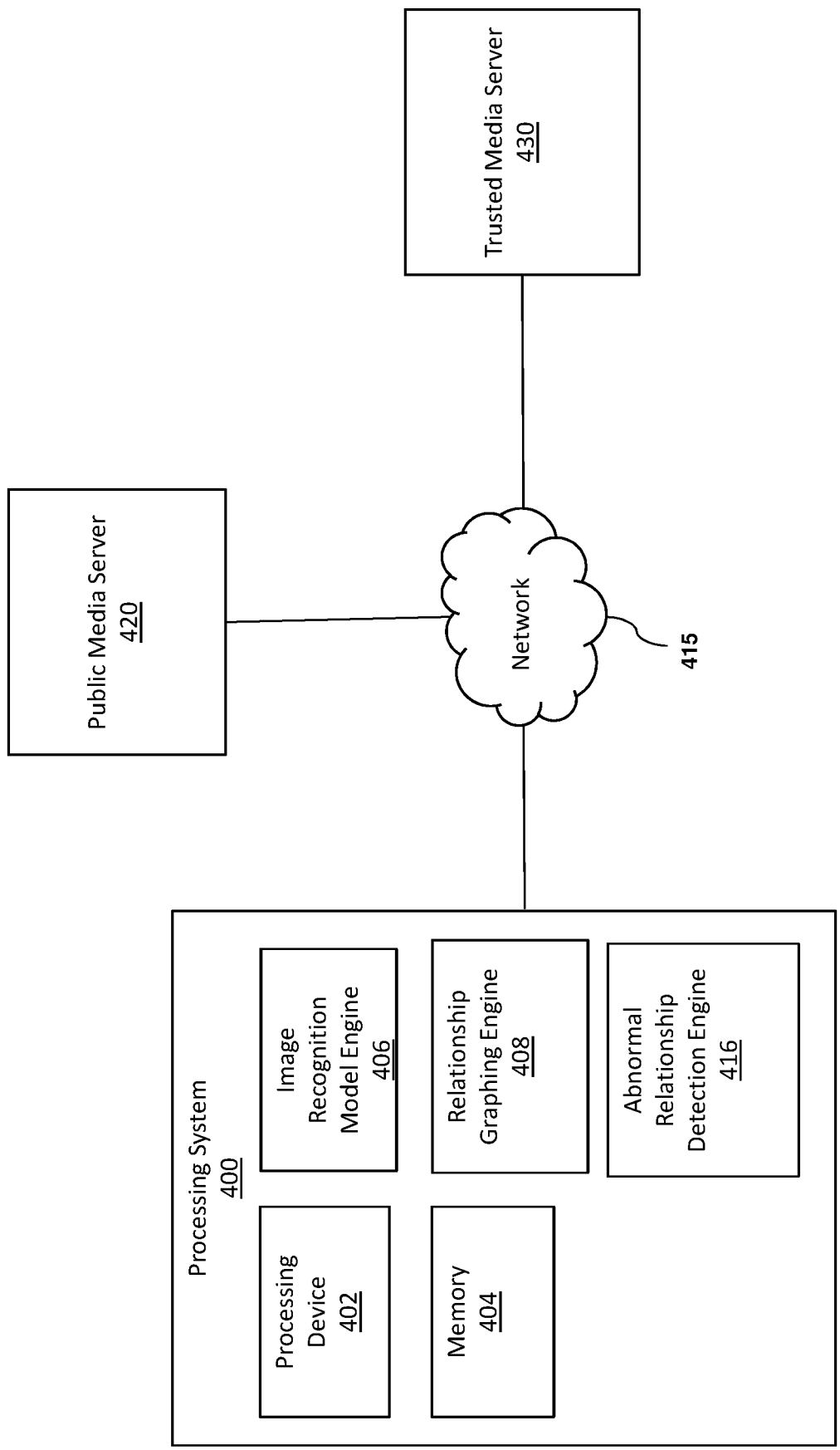
FIG. 4 depicts a system upon which filtering abnormal videos may be implemented according to one or more embodiments of the present invention.

Turning now to FIG. 4, a processing system 400 for filtering abnormal videos will now be described in accordance with an embodiment. The various components, modules, engines, etc. described regarding FIG. 4 can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the engine(s) described herein can be a combination of hardware and programming. The programming can be processor executable instructions stored on a tangible memory, and the hardware can include the processing device 402 for executing those instructions. Thus a system memory (e.g., memory 404) can store program instructions that when executed by the processing device 402 implement the engines described herein. Other engines can also be utilized to include other features and functionality described in other examples herein. Memory 404 or other system memory may store data (e.g., images, video files, relationship graphs, etc.) used and/or generated by the processing system 400 in the performance of the functions described herein.

As shown in FIG. 4, the processing system 400 may be in communication with public media server 420 and trusted media server 430 via communications network 415. The communications network 415 may be one or more of, or a combination of, public (e.g., Internet), private (e.g., local area network, wide area network, virtual private network), and may include wireless and wireline transmission systems (e.g., satellite, cellular network, terrestrial networks, etc.). Although depicted as separate devices, in various embodiments, some or all of processing system 400, public media server 420 and trusted media server 430 may be combined into a single device or cloud system.

According to some embodiments, public media server 420 may host media content such as videos for public access and viewing and may allow for the upload of user-generated media, such as user-generated videos. Processing system 400 may receive or access media content, such as one or more videos, from public media server 420 to test the media content for abnormal relationships. According to some embodiments, public media server 420 may be configured to allow processing system 400 to change settings on publically viewable videos, such as for example, to add labels or warnings to a video, to restrict videos to viewing by certain viewers (e.g., viewers of certain age groups or viewers with certain authorizations such as parental consent), to restrict a video from public viewing entirely, and/or to flag a video for human review by an employee associated with an organization that operates public media server 420.

In some embodiments, trusted media server 430 may belong to an authorized, authenticated or otherwise trusted party, such as a movie studio, a production studio, a media content distributor, an owner or facilitator of licensed media content, or the like. According to some embodiments, processing system may 400 receive or access images and videos from trusted media server that may be used to, for example, train an image recognition model and/or generate a normal subject relationship graph. Trusted media server 430 may be updated with new media content from time to time and in some embodiments, such updates may be pushed to processing system 400. In some embodiments, processing system 400 may periodically request trusted media server 430 to provide any updates to the media content used for training and generating models.

In some embodiments, processing system 400 may include an image recognition model engine 406, a relationship graphing engine 408 and an abnormal relationship detection engine 416. According to some embodiments, processing system 400 may include all or some of the components or aspects described with respect to processing system 300 shown in FIG. 3 or cloud computing environment 50 shown in FIGS. 1 and 2.

In some embodiments, the image recognition model engine 406 may receive a plurality of images that depict one or more of a plurality of subjects (e.g., characters, objects, etc.). For example, trusted media server 430 may provide a plurality of images of movie characters to processing system 400. As will be understood by those of skill in the art and as described in greater detail below, image recognition model engine may be configured to train an image recognition model using machine learning techniques, such as supervised machine learning, to recognize each of the subjects provided in the plurality of images with a specified degree of confidence. Thus, for example, the image recognition model engine 406 may be provided with hundreds of thousands of images of various movie characters and may be trained to identify each of the movie characters in subsequent images presented to the image recognition model.

In embodiments of the invention, the image recognition model engine 406 can also be implemented as a so-called classifier (described in more detail below). In one or more embodiments of the invention, the features of the image recognition model engine 406 described herein can be implemented on the processing system 300 shown in FIG. 3, or can be implemented on a neural network (not shown). In embodiments of the invention, the features of the image recognition model engine 406 can be implemented by configuring and arranging the processing system 300 to execute machine learning (ML) algorithms. In general, ML algorithms, in effect, extract features from received data (e.g., inputs to the image recognition model engine 406) in order to "classify" the received data. Examples of suitable classifiers include but are not limited to neural networks (described in greater detail below), support vector machines (SVMs), logistic regression, decision trees, hidden Markov Models (HMMs), etc. The end result of the classifier's operations, i.e., the "classification," is to predict a class for the data. The ML algorithms apply machine learning techniques to the received data in order to, over time, create/ train/update a unique "model." The learning or training performed by the image recognition model engine 406 can be supervised, unsupervised, or a hybrid that includes aspects of supervised and unsupervised learning. Supervised learning is when training data is already available and classified/labeled. Unsupervised learning is when training data is not classified/labeled so must be developed through iterations of the classifier. Unsupervised learning can utilize additional learning/training methods including, for example, clustering, anomaly detection, neural networks, deep learning, and the like.

In embodiments of the invention where the image recognition model engine 406 is implemented as a neural network, a resistive switching device (RSD) can be used as a connection (synapse) between a pre-neuron and a post-neuron, thus representing the connection weight in the form of device resistance. Neuromorphic systems are interconnected processor elements that act as simulated "neurons" and exchange "messages" between each other in the form of electronic signals. Similar to the so-called "plasticity" of synaptic neurotransmitter connections that carry messages between biological neurons, the connections in neuromorphic systems such as neural networks carry electronic messages between simulated neurons, which are provided with numeric weights that correspond to the strength or weakness of a given connection. The weights can be adjusted and tuned based on experience, making neuromorphic systems adaptive to inputs and capable of learning. For example, a neuromorphic/neural network for handwriting recognition is defined by a set of input neurons, which can be activated by the pixels of an input image. After being weighted and transformed by a function determined by the network's designer, the activations of these input neurons are then passed to other downstream neurons, which are often referred to as "hidden" neurons. This process is repeated until an output neuron is activated. Thus, the activated output neuron determines (or "learns") which character was read. Multiple pre-neurons and post-neurons can be connected through an array of RSD, which naturally expresses a fully-connected neural network. According to some embodiments, any functionality ascribed to the processing system 400 can be implemented using aspects of processing system 300.

Figure 5:
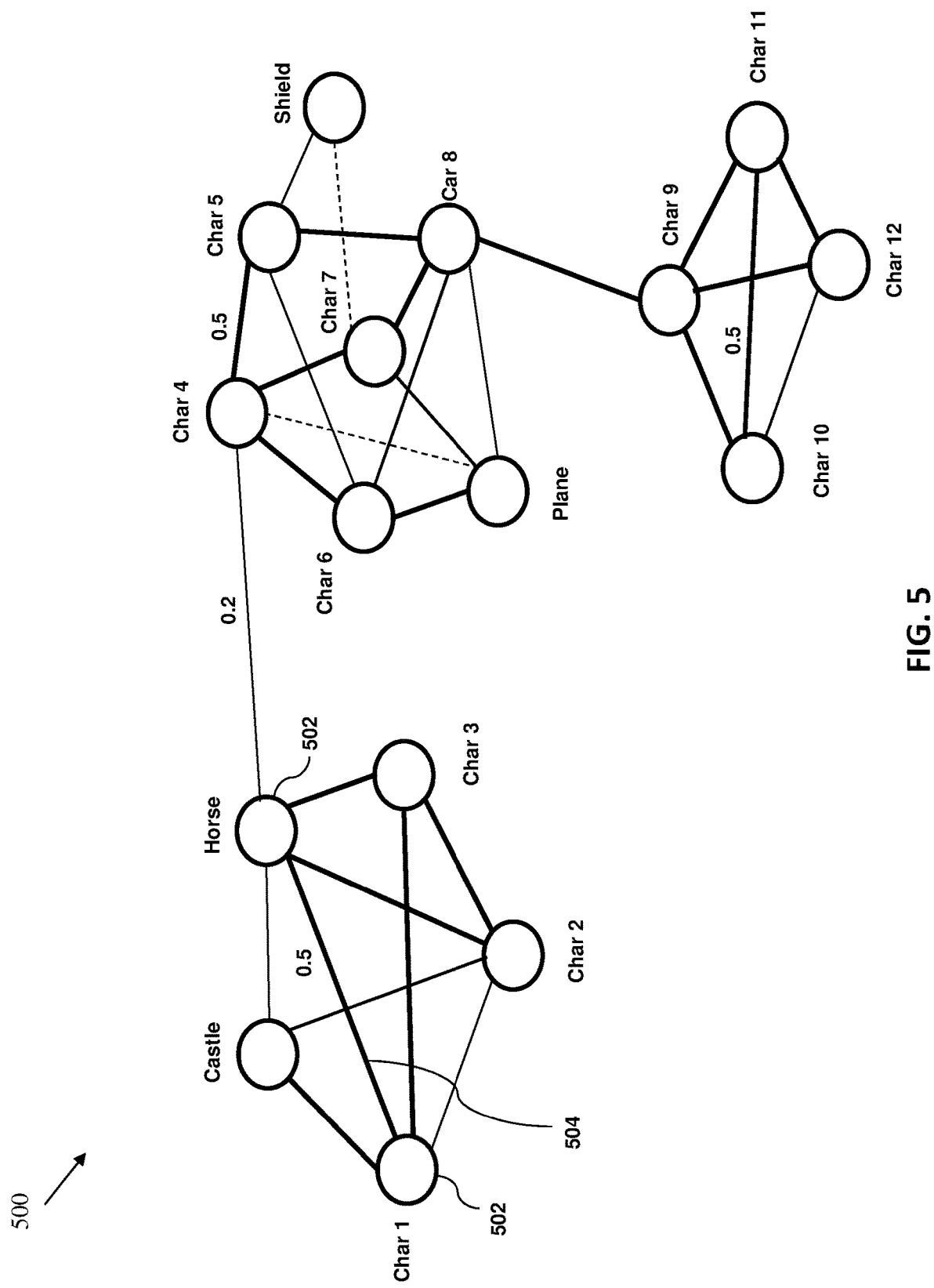
FIG. 5 depicts an example normal subject relationship graph according to one or more embodiments of the present invention.
Figure 6:
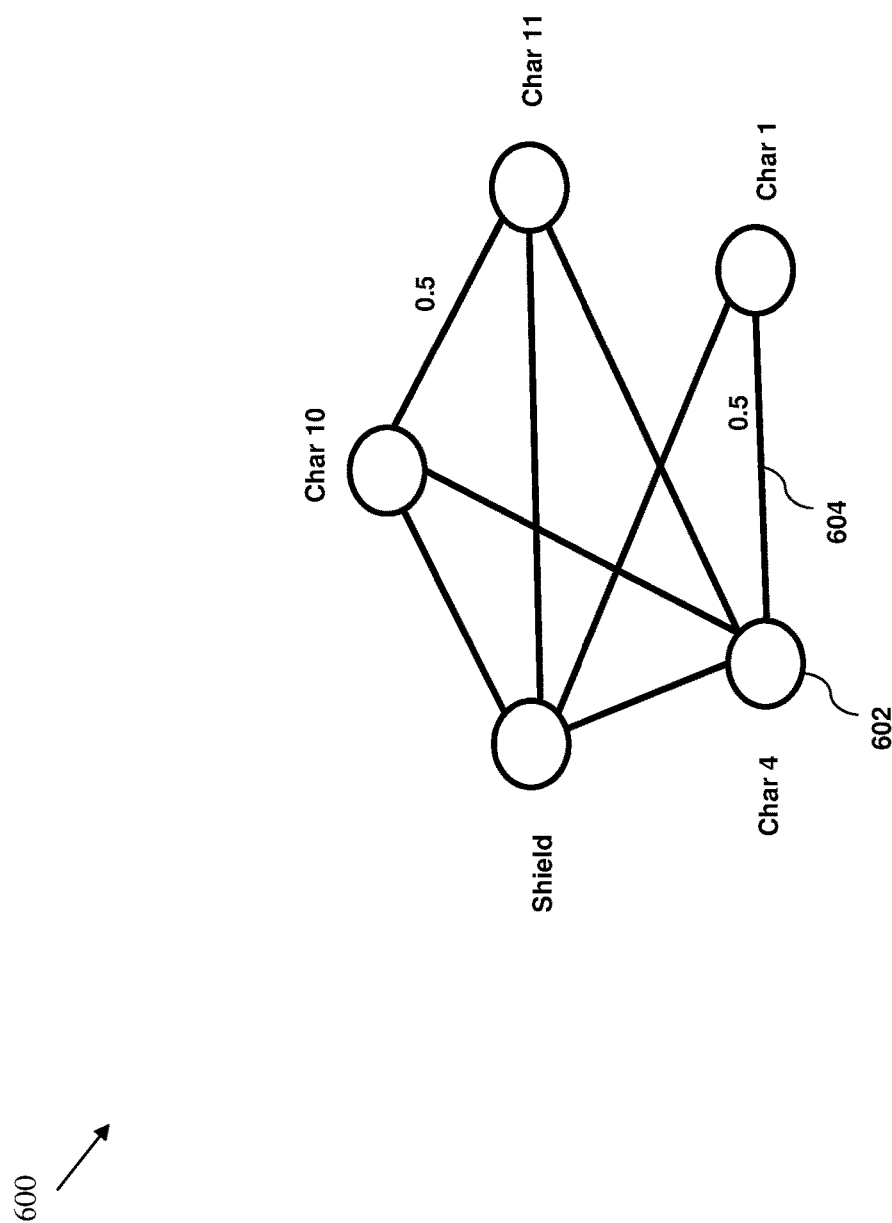
FIG. 6 depicts an example test subject relationship graph according to one or more embodiments of the present invention.

According to some embodiments, relationship graphing engine 408 may be configured to generate a normal subject relationship graph by applying the image recognition model to a plurality of training videos and/or a test subject relationship graph by applying the image recognition model to a test video. FIG. 5 depicts an example normal subject relationship graph 500 that may be generated by relationship graphing engine 408. As will be understood by those of skill in the art, relationship graphing engine 408 may include a graph database that uses graph structures for semantic queries with nodes and edges (i.e., links) that represent and store data. As shown, the normal subject relationship graph 500 may include a plurality of nodes 502. Each node 502 may correspond to a subject, such as a character or an object, that is depicted in one or more of the training videos (e.g., obtained from trusted media server 430) as identified by the trained image recognition model of processing system 400. Various pairs of nodes 502 may be connected by a link 504 that represents the existence of a non-zero relationship between the pair of nodes 502. Similarly, FIG. 6 depicts a test subject relationship graph 600, according to an embodiment, which likewise includes a plurality of nodes 602 having various links 604 between pairs of nodes 604. Each node 602 of the test subject relationship graph 600 may correspond to a subject, such as a character or an object, that is depicted a test video (e.g., obtained from public media server 420) as identified by the trained image recognition model of processing system 400. The links 504, 604 shown in FIGS. 5 and 6 are depicted as having different thicknesses that represent the relative strength of each link. In other words, thick links 504, 604 are intended to represent strong relationships between two nodes 502, 602 and think or dotted lines are intended to represent weak relationships. A pair of nodes that has no link between them may represent that there is no direct relationship between the nodes. By way of example, as shown in FIG. 5, "Char 1" (i.e., character 1) is shown to have a strong relationship with "Castle" and a weak relationship with "Char 2". Further, "Char 3" is shown as having no direct relationship with "Char 6".

According to some embodiments, relationship graphing engine 408 may generate a relationship graph by first identifying the subjects (e.g., characters, objects, etc.) present in a video and generating a node for each identified subject. As described above, a trained image recognition model of processing system 400 may be configured to identify one or more of a plurality of subjects in images or videos. Relationship graphing engine 408 may determine relationships between subjects by determining an amount of on-screen time shared by pairs of subjects and connecting all node pairs having a non-zero shared on-screen time with a link between them. The strength or thickness of the link (i.e., the strength of the relationship) may be determined based on the proportion of on-screen time a given pair of subjects shares. Such strength or thickness of the link/relationship may also be represented numerically. For example, if two characters are on-screen together for 50% of a movie (or, e.g., a plurality of training videos), this may be represented as a relationship strength of "0.5" whereas if another two characters are on-screen together for 10% of the runtime of a movie, the relationship between these two characters may be represented as "0.1". In some embodiments, the numerical strength of a relationship may not be a representation of the proportion of shared on-screen time but instead may be a function of it. For example, in some embodiments, subjects that have a shared on-screen time of more than 30% of a video may be said to have a relationship strength of "1.0", subjects that have a shared on-screen time of between 25-30% may be said to have a relationship strength of "0.8", subjects that have a shared on-screen time of between 20-25% may be said to have a relationship strength of "0.6", and so on. As will be appreciated by those of skill in the art, there may be many different algorithms that can be used in different embodiments to generate a numerical relationship strength based on a percentage of shared on-screen time between two subjects. Although FIGS. 5 and 6 do not depict numerical strengths in association with every link 504, 604 shown, it will be understood that all links may have associated numerical strengths. According to some embodiments, the strength of a relationship between two subjects that are directly related may be taken as the value of the link that connects the two nodes corresponding to the subjects. However, in some cases, two subjects may not have a direct relationship, but may nonetheless be indirectly related. For example, as shown in FIG. 5, "Char 1" is not directly related to "Char 4", but both "Char 1" and "Char 4" have a direct relationship with "Horse", and may therefore "Char 1" and "Char 4" may be considered to have an indirect relationship via an intervening node, "Horse". Similarly, "Char 1" may have an indirect relationship with "Char 5" via two intervening nodes "Horse" and "Char 4".

According to some embodiments, the abnormal relationship detection engine 416 may be configured to determine whether the test subject relationship graph includes any abnormal relationships in view of the normal relationships reflected by the normal subject relationship graph. In some embodiments, the abnormal relationship detection engine 416 may be configured to determine that a relationship between a pair of subjects of the test subject relationship graph is abnormal by comparing the strength of the relationship of the pair of subjects to the corresponding strength of the relationship between the two subjects in the normal subject relationship graph and determining whether the difference exceeds a predetermined threshold. For example, the abnormal relationship detection engine 416 may compare the relationship between "Char 10" and "Char 11" detected in a test video against the expected relationship established from the plurality of training videos by comparing the value of the link between "Char 10" and "Char 11" in the test subject relationship graph 600 to the value of the link between "Char 10" and "Char 11" in the normal subject relationship graph 500. As shown in FIGS. 5 and 6, both of these links have a value of 0.5 and thus, the difference between the two is zero. Because the difference is not above a predetermined threshold of for example 0.2, the abnormal relationship detection engine 416 may determine that there is no abnormality presented by this particular relationship as depicted in the test video. According to some embodiments, the abnormal relationship detection engine 416 may test each relationship (i.e., each link 604 between a pair of nodes 602) shown in the test subject relationship graph 600 in this manner.

For example, the abnormal relationship detection engine 416 may compare the relationships between "Char 1" and "Char 4". As shown in the test subject relationship graph 600, this pair of characters is depicted in the test video has having a test relationship strength of "0.5". According to some embodiments, although "Char 1" and "Char 4" are do not have a direct relationship (i.e., are not directly linked) in normal subject relationship graph 500, they are nonetheless indirectly linked via the intervening "Horse" node 502. In some embodiments, the strength of a relationship between two indirectly linked nodes may be determined by multiplying the links between the pair of nodes. For example, the link between "Char 1" and "Horse" has a strength of "0.5" and the link between "Horse" and "Char 4" has a strength of "0.2" and so according to some embodiments, the strength of the normal relationship between "Char 1" and "Char 4" may be determined by multiplying "0.5" by "0.2" to produce "0.1". Thus, with respect to "Char 1" and "Char 4", the difference between the test relationship strength of "0.5" and the normal relationship strength of "0.1" is "0.4". According to some embodiments, the abnormal relationship detection engine 416 may compare this difference to a predetermined threshold (e.g., "0.2") and if the difference exceeds the threshold, the abnormal relationship detection engine 416 may determine that the test relationship, and therefore the test video, is abnormal and should be flagged.

According to some embodiments, the relationship strength of a pair of subjects that are indirectly related may be adjusted by a decay factor that reduces the strength of the relationship in accordance with the number of intervening nodes between the pair of nodes corresponding to the subjects. In some embodiments, for each intervening node, the strength of the relationship may be multiplied by the decay factor. For example, when determining the normal relationship between "Char 1" and "Char 5", as shown in FIG. 5, there are two intervening nodes between "Char 1" and "Char 5", which are the "Horse" node and the "Char 4" node. Thus, in some embodiments, the relationship strength of "Char 1" and "Char 5" may be determined by multiplying the values of the intervening links together and then multiplying this product twice by the decay factor. For example, if the decay factor is "0.95", the relationship strength of "Char 1" and "Char 5" may be determined by multiplying 0.5 by 0.2 by 0.5 by 0.95 by 0.95. According to some embodiments, the decay factor may ensure a reduced relationship strength between nodes that are far removed from one another, despite potentially very strong individual intervening links. Thus, use of the decay factor may prevent two indirectly connected nodes that are separated by four interviewing links (i.e., three interviewing nodes) that all have link strengths of "1.0" from appearing as though the two indirectly connected nodes have a very strong relationship of "1.0" when in reality they do not have that strong of a connection because they are far removed from one another. In this example, assuming a decay factor of for example, "0.95", the relationship strength between the two nodes would be calculated as 1.0×1.0×. 1.0×1.0×0.95×0.95× 0.95=0.857, which reflects both the strength of the intervening links and the degrees of separation between the two nodes at issue.

Figure 7:
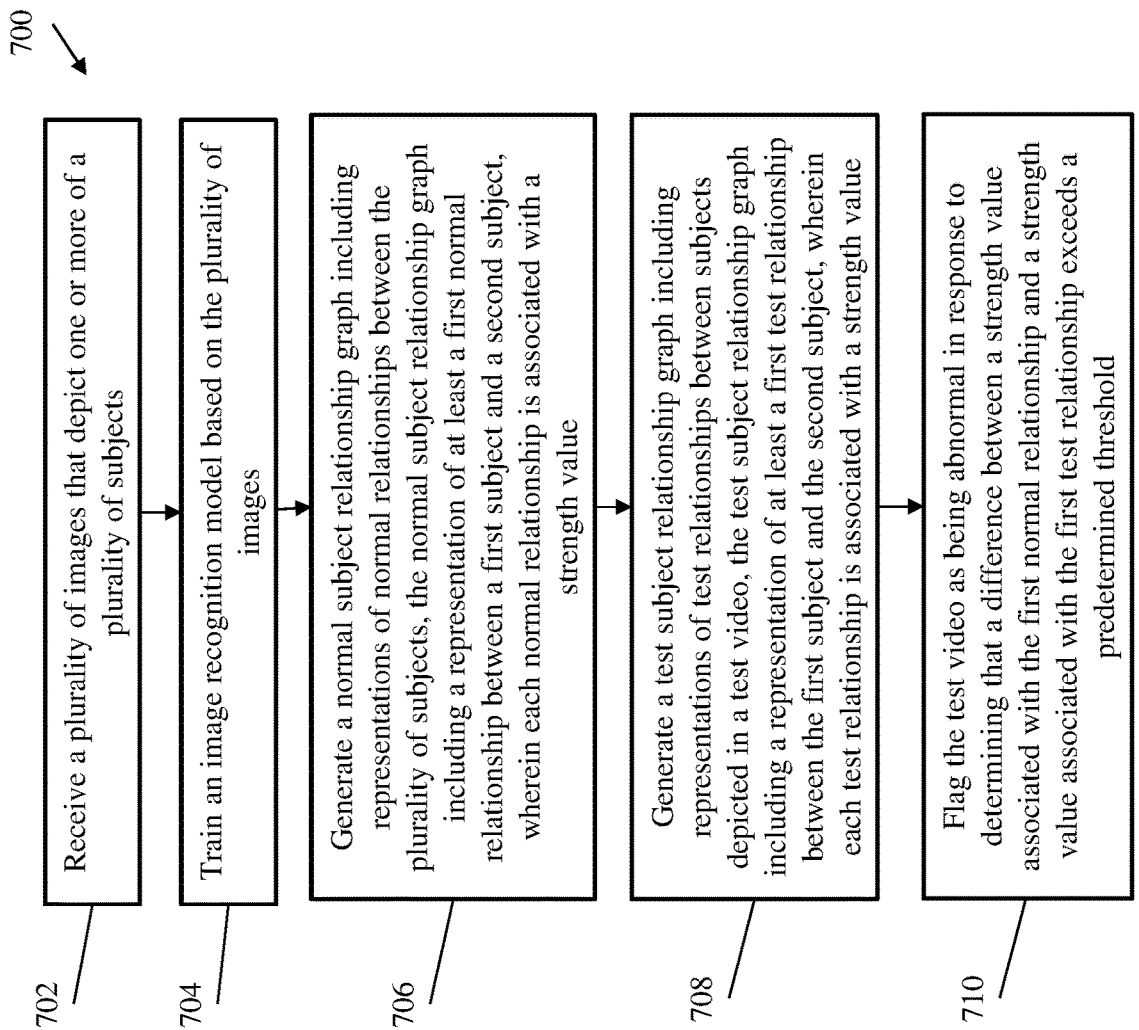
FIG. 7 depicts a flow diagram of a method for filtering abnormal videos according to one or more embodiments of the invention.

Turning now to FIG. 7, a flow diagram of a method 700 for filtering abnormal videos according to one or more embodiments of the invention. In one or more embodiments of the present invention, the method 700 may be embodied in software that is executed by computer elements located within a network that may reside in the cloud, such as the cloud computing environment 50 described herein above and illustrated in FIGS. 1 and 2. In other embodiments, the computer elements may reside on a computer system or processing system, such as the processing system 300 described herein above and illustrated in FIG. 3 or the processing system 400 described herein above and illustrated in FIG. 4, or in some other type of computing or processing environment.

The method 700 begins at block 702 and includes receiving (e.g., via processing system 400) a plurality of images that depict one or more of a plurality of subjects. The plurality of subjects may be one or more characters, people, animals and objects. For example, processing system 400 may receive or access a plurality of images from trusted media server 430. According to some embodiments, processing system 400 may be configured to automatically download new images of subjects from trusted media server 430 as a repository of images of subjects is updated on trusted media server. For example, if a new movie is released that contains images of a particular character, a media company may add images of the character from the movie or promotional materials to a repository of images stored on trusted media server 430. Thus, according to some embodiments, processing system 400 may be configured to automatically obtain authorized images (i.e., legitimate images from a trusted source) of subjects, which can allow processing system to stay current with the appearance of a character or object as it changes over time (e.g., changing appearance as the character grows older, changing hair style, changing attire, etc.).

As shown in block 704, the method 700 includes training (e.g., via processing system 400) an image recognition model based on the plurality of images. The image recognition model is trained to recognize one or more of the plurality of subjects in images. According to some embodiments, the model may be trained to recognize subjects in images with a level of accuracy that is above a predetermined threshold (e.g., being correct >95% of the time), and if following a testing phase the model does not meet the predetermined threshold accuracy, processing system 400 may be configured to request more images of one or more subjects from trusted media server and retrain the model based on additional images received from trusted media server 430.

As shown in block 706, the method 700 includes generating (e.g., via processing system 400) a normal subject relationship graph including representations of normal relationships between the plurality of subjects by applying the image recognition model to a plurality of training videos. According to some embodiments, the plurality of training videos may be videos that depict one or more of the subjects the image recognition model is trained to recognition. In some embodiments, the plurality of training videos may be received from trusted media server 430 in a manner similar to that of the plurality of images described above with respect to block 702. In some embodiments, the normal subject relationship graph includes a representation of each subject that has been identified as being depicted by at least one of the plurality of training videos. As described previous with respect to FIG. 5, each subject may be represented as a node 502 in the normal subject relationship graph and relationships between subjects may be represented by links 504 that have an associated link strength. Generally, the normal subject relationship graph represents the expected relationships between characters, as established by analysis of authorized media (i.e., the training videos) depicting the subjects. In other words, characters from a media franchise (e.g., a movie franchise, a television show, a comic strip, a novel series, etc.) will generally be expected to have strong relationships with one another, but these characters may be expected to have little or no relationship with other characters from a completely different media franchise. A "relationship" may refer to the frequency in which characters appear together or interact with one another and a "normal relationship" may refer to a relationship that is depicted (i.e., by a link 504) in the normal subject relationship graph. The normal subject relationship graph will include at least a first normal relationship between a first subject and a second subject. According to some embodiments, each normal relationship is associated with a strength value.

In some embodiments, generating the normal subject relationship graph may include generating a node associated with the subject for each subject of the plurality of subjects. Generating the normal subject relationship graph may further include establishing a node link between a pair of nodes (e.g., such as link 504) that correspond to the pair of subjects for each pair of subjects of the plurality of subjects that are depicted together in at least one of the plurality of training videos. Generating the normal subject relationship graph may further include assigning a strength value to the node link that represents a strength of the relationship between the corresponding pair of subjects for each node link.

According to some embodiments, assigning a strength value to a node link may include determining a total run time of the plurality of training videos, determining, for the corresponding pair of subjects, a total shared screen time of the pair of subjects and dividing the total run time by the total shared screen time. In other words, the strength of a node link (i.e., a link 504) may be based on a determination of the proportion of time that the pair of subjects appear on screen together in relation to the total run time of the training videos. Thus, subjects that appear on screen together for longer periods of time will have stronger relationships to one another, whereas subjects that appear on screen together infrequently will have weaker relationships to one another.

In some embodiments, determining the total shared screen time of the pair of subjects may include identifying one or more video segments that depict both subjects of the pair of subjects and determining a sum of the durations of the one or more video segments. In other words, the total shared screen time may be determined by identifying the portions of the plurality of training videos in which a given pair of subjects appear on screen together and adding up the durations of those portions.

In some embodiments, identifying a video segment of the one of more video segments may include identifying a first key frame that depicts both subjects of the pair of subjects, identifying a second key frame that does not depict both subjects of the pair of subjects, and extracting the duration of the video segment by determining an elapsed time between a time stamp associated with the first key frame and a second time stamp associated with the second key frame. As will be appreciated by those of skill in the art, a "key frame" may refer to one frame of a plurality of sequential frames of a video that is representative of the subject matter of the plurality of sequential frames. For example, a movie projector may display a movie at a speed of 24 frames per second, and thus a scene of a movie may depict two characters sitting at a table talking to one that span 10 seconds may be recorded over a span of 240 frames and the first frame of this sequence of 240 frames may be considered to be a key frame as all 240 frames will likely only exhibit small changes in the image from frame to frame. When detecting subjects in the video using the image recognition model, it would be inefficient to apply the image recognition model to all 240 frames when it would suffice to only apply it to the first frame of the 240 frames and then monitor the subsequent frames to detect a change of scene (i.e., monitor the subsequent frames to detect the next key frame). According to some embodiments, processing system 400 (e.g., via relationship graphing engine 408) may determining that a scene has changed and/or identify a second key frame by determining that the percentage of pixels that change from one frame to the next exceeds a predetermined threshold. Alternatively, in some embodiments, the total on screen time shared between two subjects may be determined by applying the image recognition model to every frame of the videos or by applying it to frames at a predetermined intervals.

According to some embodiments, at least one of the normal relationships of the normal subject relationship graph may include an indirect relationship between a pair of subjects. An indirect relationship may be a relationship in which there is no direct node link between the pair of nodes corresponding to the pair of subjects. In some embodiments, a strength value associated with the indirect relationship may represent a product of strength values of indirect node links between a pair of nodes corresponding to the pair of subjects and a decay factor, as described previously above. In some embodiments, the decay factor may be based on a number of indirect nodes positioned between the pair of nodes corresponding to the pair of subjects. For example, if two subjects are indirectly related via relationships between a series of three other subjects, the decay factor may be multiplied to the relationship three times to weight the relationship between the pair of nodes to reflect the degrees of separation. It will be understood that this example is intended to be non-limiting and various algorithms based on the degrees of separation between two indirectly related nodes may be used to weight the relationship between the two indirectly related nodes.

In some embodiments, the method may further include obtaining the one or more new videos in response to one or more new videos being published by an authorized source and retraining the image recognition model based on the plurality of training videos and the one or more new videos. For example, as previously described above, in some embodiments, if a trusted media source adds new media content to trusted media server 430, processing system 400 may be configured to automatically download or access the new media content from trusted media server 430.

As shown in block 708, the method 700 includes generating (e.g., via processing system 400) a test subject relationship graph including representations of test relationships between subjects depicted in the test video by applying the image recognition model to a test video. According to some embodiments, the test video may be received (or otherwise accessed) from public media server 420. In some embodiments, every time a new video is published on public media server 420 it may be received by processing system 400 as a test video. In some embodiments, processing system 400 may receive/access a video hosted by public media server 420 in response to a user attempting to play the video. The test subject relationship graph includes each subject that is identified as being depicted in the test video and includes at least a representation of a first test relationship between the first subject and the second subject. The test subject relationship graph may be generated in a manner similar to that of the generation of the normal subject relationship graph by applying the image recognition model to the test video to identify subjects depicted in the test video and then generating links/relationships between them (e.g., via relationship graphing engine 408). According to some embodiments, each test relationship is associated with a strength value.

As shown in block 710, the method 700 includes flagging (e.g., via processing system 400) the test video as being abnormal in response to determining that a difference between a strength value associated with the first normal relationship and a strength value associated with the first test relationship exceeds a predetermined threshold. Thus, processing system 400 may flag a video as being abnormal if it determines that the video includes a pair of subjects that have a relationship that is abnormal in comparison to the normal relationship of the pair of subjects as reflected in the normal subject relationship graph. In other words, if two normally unrelated characters are appearing together in a test video, this may be an indication that the test video may include content that is inappropriate for some viewers or alternatively may be an indication that the video is utilizing media content owned by another in an unauthorized manner that may possibly be an infringement of intellectual property rights of the copyright owner of the media content (e.g., the copyright owner of characters being depicted in the test video).

In some embodiments, flagging the test video as abnormal may include restricting access to the test video. In some embodiments, restricting access to the test video may include preventing a user from playing the video on public media server 420 or causing public media server 420 to require the viewer to be of a certain age or have parental consent to view the test video. In some embodiments, flagging the test video may cause processing system 400 to notify public media server 420 that the test video should be reviewed and classified by a human.

Although the techniques described herein are generally described with respect to detection of an abnormal video, it should be understood that it is contemplated that the techniques described herein may also be applied to other forms of media, such as text, sound, still images, or any other form of media that can be classified by characters, objects or other such subjects represented by the media. For example a model may be trained to recognize voices of various characters or names and other words associated with various characters based on a repository of audio and/or written media provided by the trusted media source and a normal relationship graph may be generated. The model may then be applied to test sound clips or text files, as applicable, to generate a test relationship graph, and abnormal audio and/or text files may be identified in a manner similar to that described above with respect to videos.

Additional processes may also be included. It should be understood that the process depicted in FIG. 7 represents an illustration, and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
receiving a plurality of images that depict one or more of a plurality of subjects;
training an image recognition model based on the plurality of images, wherein the image recognition model is trained to recognize one or more of the plurality of subjects in images;
generating, by applying the image recognition model to a plurality of training videos, a normal subject relationship graph comprising representations of normal relationships between the plurality of subjects, the normal subject relationship graph comprising a representation of at least a first normal relationship between a first subject and a second subject, wherein each normal relationship is associated with a strength value;
generating, by applying the image recognition model to a test video, a test subject relationship graph comprising representations of test relationships between subjects depicted in the test video, the test subject relationship graph comprising a representation of at least a first test relationship between the first subject and the second subject, wherein each test relationship is associated with a strength value; and
responsive to determining that a difference between a strength value associated with the first normal relationship and a strength value associated with the first test relationship exceeds a predetermined threshold, flagging the test video as being abnormal.

2. The computer-implemented method of claim 1, wherein the plurality of subjects comprises one or more characters, people, animals and objects.

3. The computer-implemented method of claim 1, wherein generating the normal subject relationship graph comprises:
for each subject of the plurality of subjects, generating a node associated with the subject;
for each pair of subjects of the plurality of subjects that are depicted together in at least one of the plurality of training videos, establishing a node link between a pair of nodes that correspond to the pair of subjects, wherein the node link represents a relationship between the pair of subjects; and for each node link, assigning a strength value to the node link that represents a strength of the relationship between the corresponding pair of subjects.

4. The computer-implemented method of claim 3, wherein assigning a strength value to the node link comprises:

determining a total run time of the plurality of training videos;

determining, for the corresponding pair of subjects, a total shared screen time of the pair of subjects; and dividing the total run time by the total shared screen time.

5. The computer-implemented method of claim 4, wherein determining the total shared screen time of the pair of subjects comprises:

identifying one or more video segments that depict both subjects of the pair of subjects, each video segment having a duration; and determining a sum of durations corresponding to the one or more video segments.

6. The computer-implemented method of claim 5, wherein identifying a video segment of the one of more video segments comprises:

identifying a first key frame having a first time stamp, wherein the first key frame depicts both subjects of the pair of subjects;

identifying a second key frame having a second time stamp, wherein the second key frame does not depict both subjects of the pair of subjects; and extracting the duration of the video segment by determining an elapsed time between the first time stamp and the second time stamp.

7. The computer-implemented method of claim 1, wherein at least one of the normal relationships comprises an indirect relationship between a pair of subjects, the indirect relationship comprising a relationship in which there is no direct node link between the pair of nodes corresponding to the pair of subjects, and wherein a strength value associated with the indirect relationship represents a product of strength values of indirect node links between a pair of nodes corresponding to the pair of subjects and a decay factor.

8. The computer-implemented method of claim 6, wherein the decay factor is based on a number of indirect nodes positioned between the pair of nodes corresponding to the pair of subjects.

9. The computer-implemented method of claim 1, further comprising:

responsive to one or more new videos being published by an authorized source, obtaining the one or more new videos; and retraining the image recognition model based on the plurality of training videos and the one or more new videos.

10. The computer-implemented method of claim 1, wherein flagging the test video as abnormal comprises restricting access to the test video.

11. A system comprising:

a processor communicatively coupled to a memory, the processor configured to:

receive a plurality of images that depict one or more of a plurality of subjects;

train an image recognition model based on the plurality of images, wherein the image recognition model is trained to recognize one or more of the plurality of subjects in images;

generate, by applying the image recognition model to a plurality of training videos, a normal subject relationship graph comprising representations of normal relationships between the plurality of subjects, the normal subject relationship graph comprising a representation of at least a first normal relationship between a first subject and a second subject, wherein each normal relationship is associated with a strength value;

generate, by applying the image recognition model to a test video, a test subject relationship graph comprising representations of test relationships between subjects depicted in the test video, the test subject relationship graph comprising a representation of at least a first test relationship between the first subject and the second subject, wherein each test relationship is associated with a strength value; and responsive to determining that a difference between a strength value associated with the first normal relationship and a strength value associated with the first test relationship exceeds a predetermined threshold, flag the test video as being abnormal.

12. The system of claim 11, wherein generating the normal subject relationship graph comprises:

for each subject of the plurality of subjects, generating a node associated with the subject;

for each pair of subjects of the plurality of subjects that are depicted together in at least one of the plurality of training videos, establishing a node link between a pair of nodes that correspond to the pair of subjects, wherein the node link represents a relationship between the pair of subjects; and for each node link, assigning a strength value to the node link that represents a strength of the relationship between the corresponding pair of subjects.

13. The system of claim 12, wherein assigning a strength value to the node link comprises:

determining a total run time of the plurality of training videos;

determining, for the corresponding pair of subjects, a total shared screen time of the pair of subjects; and dividing the total run time by the total shared screen time.

14. The system of claim 13, wherein determining the total shared screen time of the pair of subjects comprises:

identifying one or more video segments that depict both subjects of the pair of subjects, each video segment having a duration; and determining a sum of durations corresponding to the one or more video segments.

15. The system of claim 14, wherein identifying a video segment of the one of more video segments comprises:

identifying a first key frame having a first time stamp, wherein the first key frame depicts both subjects of the pair of subjects;

identifying a second key frame having a second time stamp, wherein the second key frame does not depict both subjects of the pair of subjects; and extracting the duration of the video segment by determining an elapsed time between the first time stamp and the second time stamp.

16. The system of claim 11, wherein flagging the test video as abnormal comprises restricting access to the test video.

17. A computer program product comprising a computer readable storage medium having program instructions embodied therewith the program instructions executable by a computer processor to cause the computer processor to perform a method comprising:
   receiving a plurality of images that depict one or more of a plurality of subjects;
   training an image recognition model based on the plurality of images, wherein the image recognition model is trained to recognize one or more of the plurality of subjects in images;
   generating, by applying the image recognition model to a plurality of training videos, a normal subject relationship graph comprising representations of normal relationships between the plurality of subjects, the normal subject relationship graph comprising a representation of at least a first normal relationship between a first subject and a second subject, wherein each normal relationship is associated with a strength value;
   generating, by applying the image recognition model to a test video, a test subject relationship graph comprising representations of test relationships between subjects depicted in the test video, the test subject relationship graph comprising a representation of at least a first test relationship between the first subject and the second subject, wherein each test relationship is associated with a strength value; and
   responsive to determining that a difference between a strength value associated with the first normal relationship and a strength value associated with the first test relationship exceeds a predetermined threshold, flagging the test video as being abnormal.

18. The computer program product of claim 17, wherein generating the normal subject relationship graph comprises:
   for each subject of the plurality of subjects, generating a node associated with the subject;
   for each pair of subjects of the plurality of subjects that are depicted together in at least one of the plurality of training videos, establishing a node link between a pair of nodes that correspond to the pair of subjects, wherein the node link represents a relationship between the pair of subjects; and
   for each node link, assigning a strength value to the node link that represents a strength of the relationship between the corresponding pair of subjects.

19. The computer program product of claim 18, wherein assigning a strength value to the node link comprises:
   determining a total run time of the plurality of training videos;
   determining, for the corresponding pair of subjects, a total shared screen time of the pair of subjects; and
   dividing the total run time by the total shared screen time.

20. The computer program product of claim 17, wherein determining the total shared screen time of the pair of subjects comprises:
   identifying one or more video segments that depict both subjects of the pair of subjects, each video segment having a duration; and
   determining a sum of durations corresponding to the one or more video segments.

* * * * *